March 4, 1924.

P. L. TA'BOIS 1,486,058

APPARATUS FOR SUPPLYING VAPORIZED LIQUID FUEL TO INTERNAL COMBUSTION ENGINES

Filed Aug. 26, 1920      5 Sheets-Sheet 2

WITNESSES
H. T. Walker
A. L. Kitchin

INVENTOR
PERCIVAL L. TA'BOIS
BY Munn & Co.
ATTORNEYS

March 4, 1924.

P. L. TA'BOIS 1,486,058

APPARATUS FOR SUPPLYING VAPORIZED LIQUID FUEL TO INTERNAL COMBUSTION ENGINES

Filed Aug. 26, 1920   5 Sheets-Sheet 4

WITNESSES

INVENTOR
PERCIVAL L. TA'BOIS
BY
ATTORNEYS

March 4, 1924.

P. L. TA'BOIS 1,486,058

APPARATUS FOR SUPPLYING VAPORIZED LIQUID FUEL TO INTERNAL COMBUSTION ENGINES

Filed Aug. 26, 1920   5 Sheets-Sheet 5

WITNESSES

INVENTOR
PERCIVAL L. TA'BOIS
BY
ATTORNEYS

Patented Mar. 4, 1924.

1,486,058

UNITED STATES PATENT OFFICE.

PERCIVAL L. TA'BOIS, OF NEW YORK, N. Y., ASSIGNOR OF ONE-HALF TO WILLIAM B. ROBESON, OF PORT HURON, MICHIGAN.

APPARATUS FOR SUPPLYING VAPORIZED LIQUID FUEL TO INTERNAL-COMBUSTION ENGINES.

Application filed August 26, 1920. Serial No. 406,082.

*To all whom it may concern:*

Be it known that I, PERCIVAL L. TA'BOIS, a subject of the King of Great Britain, and a resident of New York, borough of Manhattan, county and State of New York, have invented a new and Improved Apparatus for Supplying Vaporized Liquid Fuel to Internal-Combustion Engines, of which the following is a full, clear, and exact description.

My invention relates to liquid fuel vaporizing apparatus wherein both kerosene and gasoline and other oil fuels may be used, and relates more specifically for use of the more heavy and less volatile oils.

Another object of the invention is to provide a new and useful apparatus in which vaporization of the oil is accelerated and effected, by the removal of or rarefaction of the air above the oil.

A further object is to provide a vaporizing apparatus to secure a vapor from kerosene or other oil fuel in a liquid state, and then mix the vapor with air at the instant the air is drawn into the combustion cylinder, whereby a complete and perfect explosive mixture is secured.

A still further object of the invention is to provide a vaporizing apparatus using kerosene or other volatile oil fuels, provided with attachment whereby gasoline may be used also, as well as a supply of water.

A still further object of the invention is to provide a vaporizing apparatus in which oil fuel is vaporized by the combined action and rarefaction of the atmosphere above the liquid.

In the accompanying drawings:—

Figure 7 is a view similar to Figure 1 but showing a modified form of the invention.

Figures 1, 2, 6, 10:
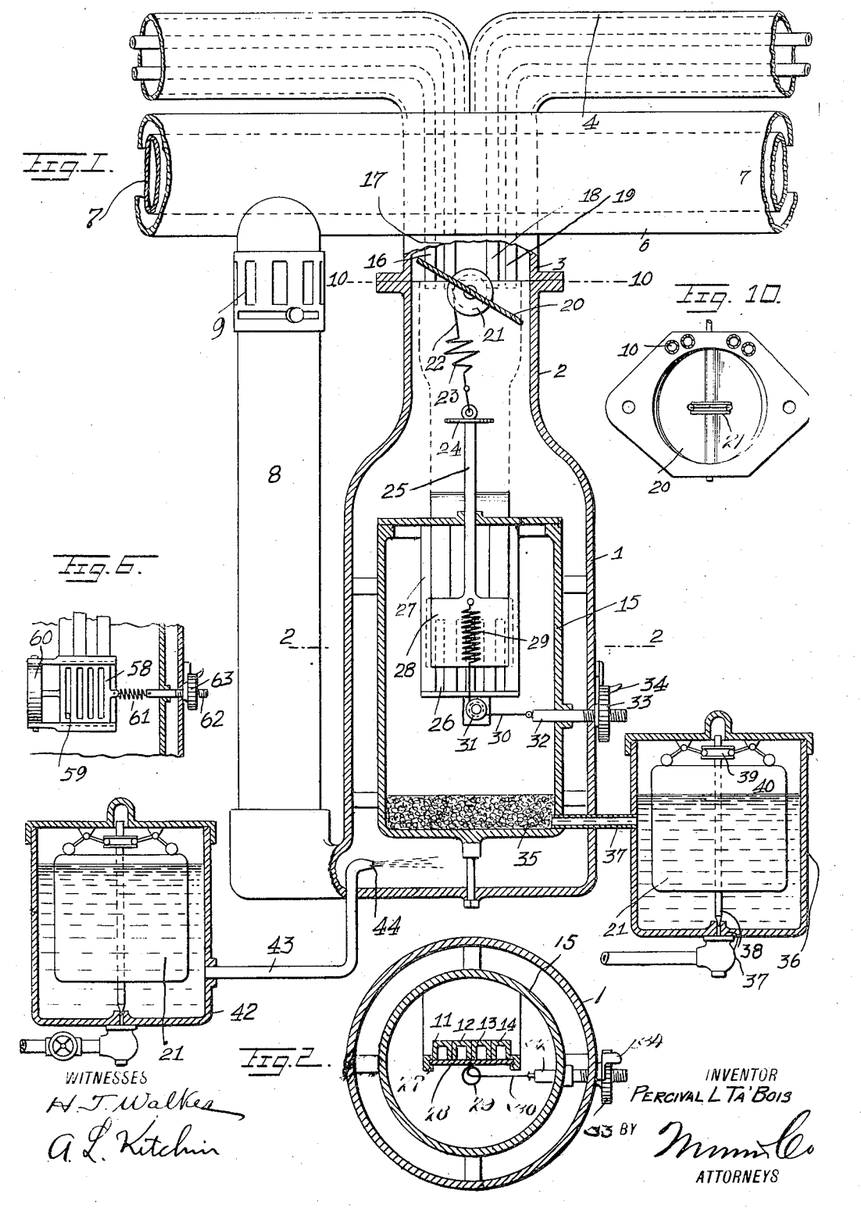
Figure 1 is a fragmentary sectional view through a carbureter embodying the invention, certain parts of the engine to which it is connected being shown in elevation.
Figure 2 is a sectional view through Figure 1 on line 2—2.
Figure 6 is a detail fragmentary view partly in section showing a modified form of adjustment to that shown in Figure 1.
Figure 10 is a sectional view through Figure 1 on line 10—10.
Figure 2:
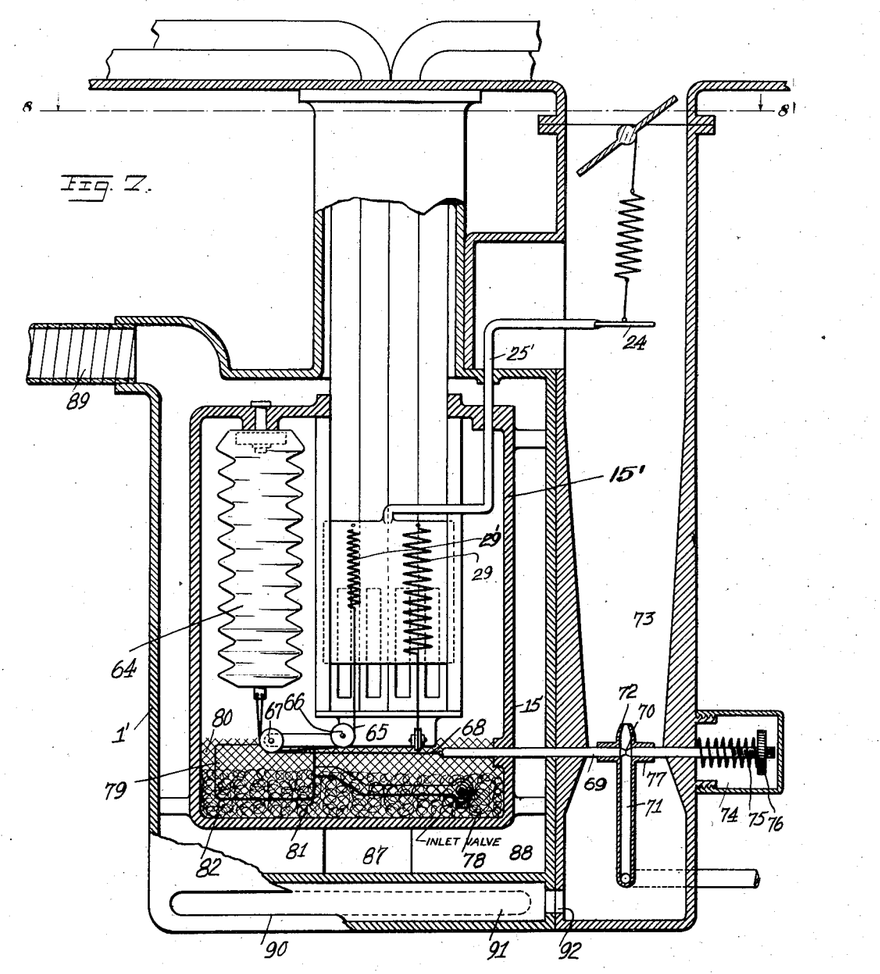

Referring to the drawings numeral 1 indicates the casing of the carbureter which is provided with a discharge throat 2 bolted or otherwise rigidly secured to the down leg 3 of the air intake manifold 4. This manifold is connected in any suitable manner with the various engine cylinders 5 (Fig. 3), whereby air may be drawn into the cylinder at the proper time. To provide air at a desired temperature, a hood or shell 6 is positioned over the exhaust manifold 7 and, consequently, air drawn through said hood into the casing 1 will be more or less heated, said air passing from hood 6 to casing 1 through a pipe 8.

A plurality of pipes 16, 17, 18 and 19 emerging from the intake manifold 4 register with the passage-ways 10 as indicated in Figures 1 and 10. Preferably, these passage-ways may be cast directly with casing 1. Another set of conduits extend from the passage-ways 10 to a mid position of binding 15. Thus, it is seen that a fuel conductor is formed extending from the center of the carbureter through the intake manifold to the cylinders.

The throat 2 is provided with an ordinary butterfly valve 20 which operates in the usual manner but which is formed with a special pulley or wheel 21 to which the cable or cord 22 is secured and on which it is wound. The winding up of the cable or cord 22 as the butterfly valve opens, pulls on the spring 23 raising the disk 24 and the rod 25 if they have not been previously raised, by the air rush.

The carbureter body 15 may be formed of metal or any suitable material and is substantially air-tight, said body being held preferably centrally of the casing 1 so that the heated air from pipe 8 may freely circulate entirely around it.

As indicated in Figure 2 the various conduits 11, 12, 13 and 14 which corresponds to the number of cylinders in the engine are positioned centrally in body 15 and their lower ends are provided with slots or openings 26 into which vapor from body 15 passes and from thence into one of the passageways 10 and the various pipes 16 to 19, inclusive. A frame 27 is connected in any suitable manner with body 15 and provides run-ways for a valve or gate 28 which is adapted to move over the openings 26 in order to close them completely or partially. This gate is rigidly secured to the stem 25 so that whenever the passage of air through the throat 2 causes the disk 24 to be raised, gate 28 will be opened to the same extent.

The gate 28 is provided with spring 29 to provide disk 24 with a resistance substantially equal to the pull caused by the air suction. This spring is pivoted to gate 28 and its other end is connected by means of a flexible element 30 passing over a pulley 31 to tension regulating rod 32. This adjusting bar extends through the body 15 and casing 1 so as to receive the nut 33 threaded thereon, said nut being roughened or knurled to receive a locking spring member 34 which prevents accidental rotation thereof. In case it should be found that the gate 28 opens too much, nut 23 is turned for bringing the spring 29 under a greater tension. It is, of course, evident that if the gate does not open sufficiently, the tension must be reduced.

The body 15 is connected with the float chamber 36 by means of tube 37 whose size may be determined by the engine which the carbureter is applied to. The bottom of body 15 is padded with either an absorbent or nonabsorbent material whose surface is substantially level with the surface of the fuel in float chamber 36. This padding at the bottom of body 15 prevents the splashing of the fuel in its inrush in the chamber thereby eliminating possible clogging of opening 26.

The float chamber 36, is of the usual type provided with an inlet opening 36′ adapted to be closed by a valve 38 connected with the regulating members 39 which regulating members are actuated by the float 40. In some cases it is desired to use a small quantity of water continuously or intermittently with the kerosene or other fuel. When water is to be used the valve 21 is turned on so that water is fed into the float chamber 42, said float chamber and associated parts being identical with chamber 36 and associated parts. However, the discharge pipe 43, is preferably provided with a restricted nozzle 44 and said nozzle pointing in a direction away from the air entrance pipe 8, and at a level substantially with that of the water in chamber 42.

It will be noted that the water is discharged into a space beneath the body 15 and is absorbed by the heated air as the latter passes upwardly to throat 2 and intake manifold 4.

Figure 3:
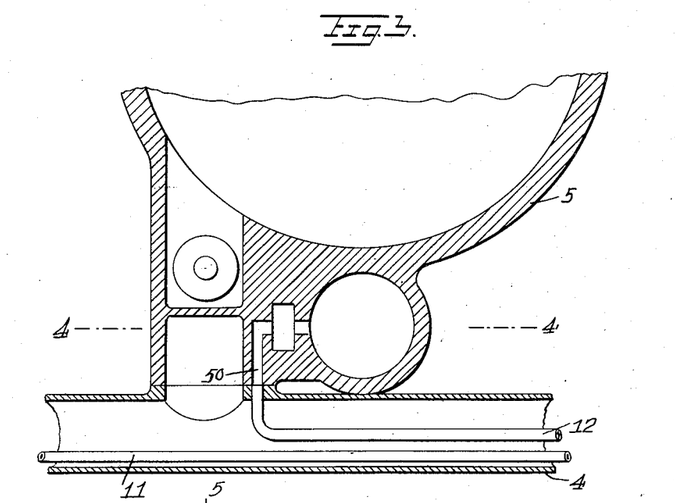
Figure 3 is a fragmentary sectional view through the upper part of the cylinder to which the carbureter shown in Figure 1 is connected, said section being taken approximately on line 3—3 of Figure 4.
Figure 4:
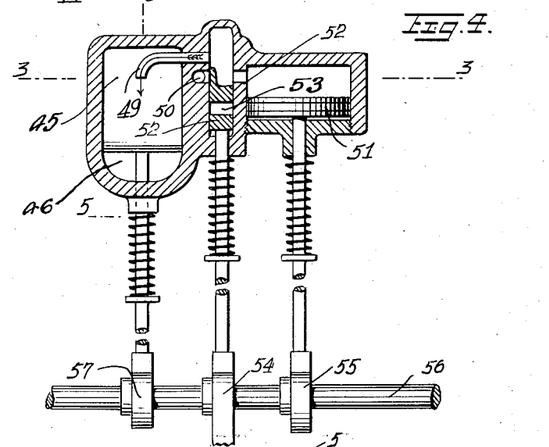
Figure 4 is a sectional view through Figure 3 on line 4—4.
Figure 5:
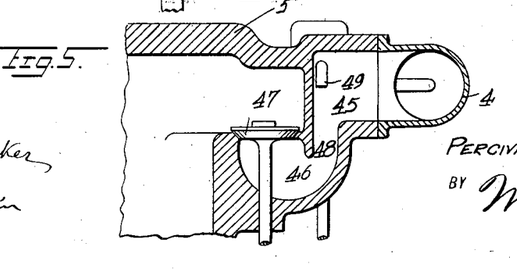
Figure 5 is a fragmentary sectional view through Figure 4 on line 5.

As shown in Figures 3 to 5, air passes from the manifold 4 into the entrance opening 45 and from thence downwardly into the curved opening 46 and finally through the inlet valve 47 into the cylinder 5. As the air passes downwardly through the restricted section 48, it mixes with the fuel vapor supplied by body 15, said fuel vapor being discharged out of the pipe or nozzle 49, by the device hereinafter described. For instance, pipe 12 is shown connected to the passage-way 50, so that the pump 51 will suck in vapor from chamber 15 and then force the vapor from the nozzle 49 into the restricted section 48. A regulating valve 52 is provided between the pump 51 and passage-way 50 and nozzle 49 so that the parts may operate in proper time. This valve is merely a reciprocating block having an opening 53 which is brought into register with the passage-way 50 and closes nozzle 49 when pump 51 is starting its suction stroke.

Suitable cams 54 and 55 are arranged on the cam shaft for timing the particular movements of the pump 51 and the valve 52. The valve 47 is, of course, operated by a suitable cam 57 (Fig. 4) to open and close at the proper time. In operation, therefore, the gas vapor is forced into action by the pump 51. Assuming that the engine is standing still and that the body 15 is supplied with air at an atmospheric pressure and fuel from chamber 36 is being supplied to the body 15, it will be necessary to turn over the engine in any desired manner. The turning over of the engine will operate the pump 51 and as soon as the same begins to operate, it will draw or suck the air out of body 15 until an appreciable rarefaction has taken place where upon the fuel will begin to vaporize and be drawn through the openings 26 and eventually discharge out at nozzles 49 into the respective cylinders. As the engine warms up, the production and movement of the vapor will come easier until a substantially perfect action is secured.

When it is desired to speed up the engine, the throttle or butterfly valve 20 is opened more. The opening of this valve will permit the suction of the pistons of the various cylinders to produce a greater flow of air past the disk 24 and will, consequently, opening the gate 28 wider and wider, and allowing proportionally more vapor to flow through the openings 26 to the pump and engine cylinders. The action just described is either with or without the supply of water from chamber 42.

The device indicated in Figure 6 may be used in place of gate 28 and disk 24 or in addition to the latter. Gate 58 of this device registers with openings 26 normally closing the latter when the engine is not in operation.

The operation is as follows: The fixed vacuum chamber 60 sucks gate 58 inwardly overcoming the tension of spring 61 and thus causing ribs 59 to close the openings 26. As the engine is turned a rarefaction of air takes place in body 15 thereby causing a low atmospheric pressure against the gate 58 allowing spring 61 to overcome the vacuum pull on the gate and pulling the latter sideways of openings 26. It is understood that the degree of movement of this gate depends upon the rarefaction of the air in body 15 which in turn is caused by the speed of the engine. This gate is also provided with a rod 62 threaded at one end and a knurled nut 63 engaging the threaded portion of the nut 33 by means of which the tension of spring 61 may be varied.

Figure 8:
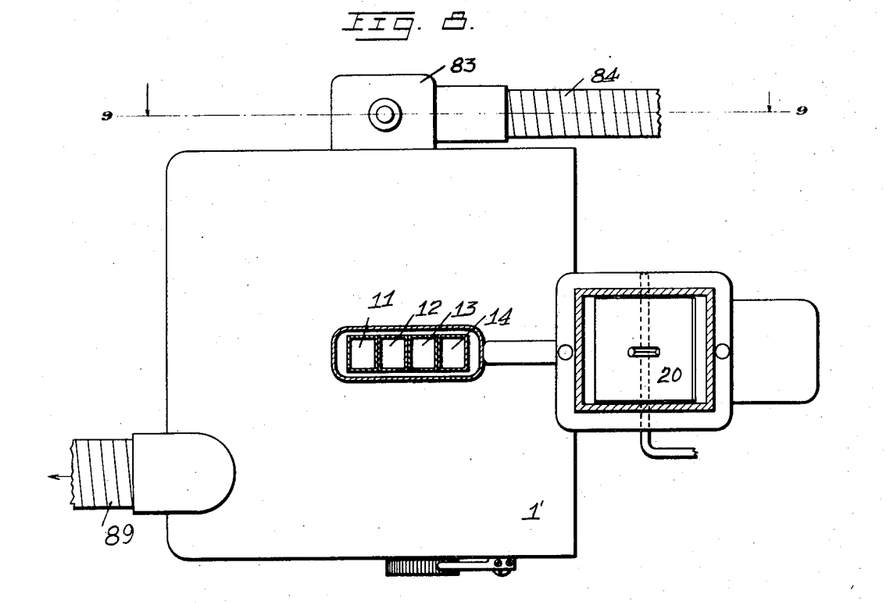
Figure 8 is a sectional view through Figure 7, approximately on line 8—8.
Figure 9:
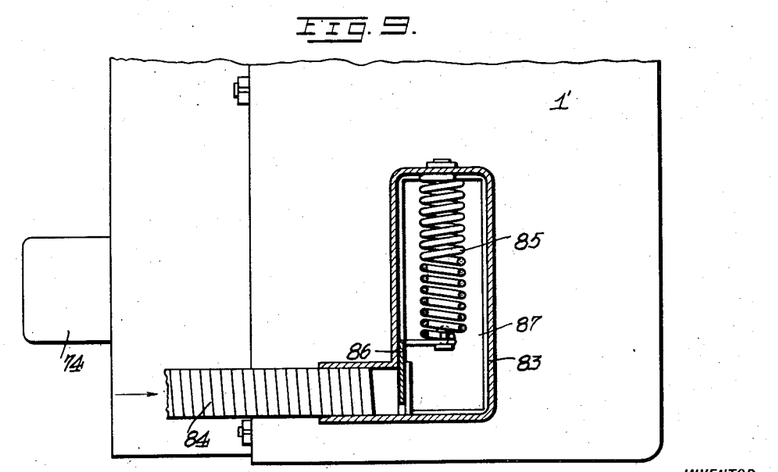
Figure 9 is a vertical sectional view through Figure 8 approximately on line 9—9.

Referring to Figures 7, 8 and 9, a double set of regulating means is provided for the gate 28 and also means are provided for using gasoline for starting the engine and then automatically turning off the gasoline. In this form of the invention in addition to the spring 29 and associated parts, there is provided an auxiliary spring 29', which is connected to the expansible diaphragm 64 through a cable 65 which cable passes over pulleys 66 and 67. The diaphragm 64 is exhausted of air and is made of spring material so that when the body 15' is supplied with air under atmospheric pressure, it will be constricted or somewhat collapsed and will, consequently, pull the spring 29' for holding gate 28 nearly closed. As soon as the air in the body 15' begins to become rarefied, the pressure on the exterior surface of the diaphragm 64 will thereby be reduced and the spring action thereof will begin to exert itself so that it will expand and release spring 29' in direct proportion to the reduction of pressure within body 15. This will allow the gate 28 to open more and more freely according to the degree of rarefaction in the body 15', and thus regulate the flow of vapor accordingly from said body. In addition, a cable 68 is connected with the diaphragm 64 and passes over pulley 67 to the rod 69 to which it is connected. Rod 69 is provided with a restricted portion 70 positioned in the gasoline inlet pipe 71. This inlet pipe may be connected with any suitable form of nozzle 72 and which pipe is also supplied with gasoline from a suitable float chamber or other source. The rod 69 not only extends through the pipe 71 but also through the entire chamber 73 into an auxiliary chamber 74 where a spring 75 rounds the end. A nut 76 is threaded onto the end of bar 69 and more or less compresses the spring 75 so that when the diaphragm 64 begins to expand under the influence of a high rarefaction in chamber 15, spring 75 will move the bar 69 longitudinally until the restricted section 70 will move into the gasoline flue of pipe 71. This will turn on the supply of gasoline automatically. When the fuel becomes heated and the vapor pressure increases within the chamber 15, then the diaphragm will be contracted and the restricted section 70, will move into the hub portion 77 of pipe 70. This will shut off the supply of gasoline automatically, as the fuel vapor comes into action. This, of course, does not take place until the fuel vapor from chamber 15' has begun to be fed into the respective cylinders. In this way the engine may be started immediately and easily with gasoline. In this form of the invention, the shaft 25' is bent so that the disk 24 will be in the casing or housing 73 whereby the passage of air will operate the same as heretofore described with respect to Figure 1.

Arranged at a convenient point near the bottom of body 15' is an inlet valve 78 which acts to admit kerosene in body 15' but which is opened and closed by a float 79. A suitable wire mesh casing 80 surrounds the float 79, the bar 81 and valve 78 so that the filling of metal wool 82 will not interfere with the proper action of the float. These parts are arranged so that the oil level will be approximately the same height as the metal wool 82.

In order to provide a proper supply of heat for the body 15' all or part of the exhaust gases from the engine is supplied to a side inclosure 83 through a flexible pipe 84. As shown in Figure 9, the inclosure 83 contains a spring 85 connected to a sliding gate 86 which acts to open and close entrance to pipe 84 and thereby regulating the amount of heat desired. The member 85 acts under its resilient characteristics to open the gate 86 but acts to close the same through the expansible liquid contained therein. As the liquid expands it forces the coils of the spring member 85 to separate and gradually close the gate 86. The chamber 83 is provided with an opening 87 in communication with the lower part of the chamber 88 surrounding the body 15', said chamber being formed by the casing 1'. As the hot exhaust passes into the chamber 88 it will automatically heat to a more or less extent, the body 15 and finally pass out the discharge pipe 89. By these means, the body 15' and the fuel supplied thereto are maintained at a desired temperature so that the vapor from the oil may have a desired vapor pressure and properly mix with the air passing through the chamber 73. This air is supplied from the atmosphere through the slot or opening 90 and as the air passes into slot 90 it must travel through the chamber 91 before it can pass through the opening 92 into chamber 73 and as it passes from chamber 91 it becomes heated in contacting the bottom of said chamber which as seen is heated by the exhaust gases.

Figure 11:
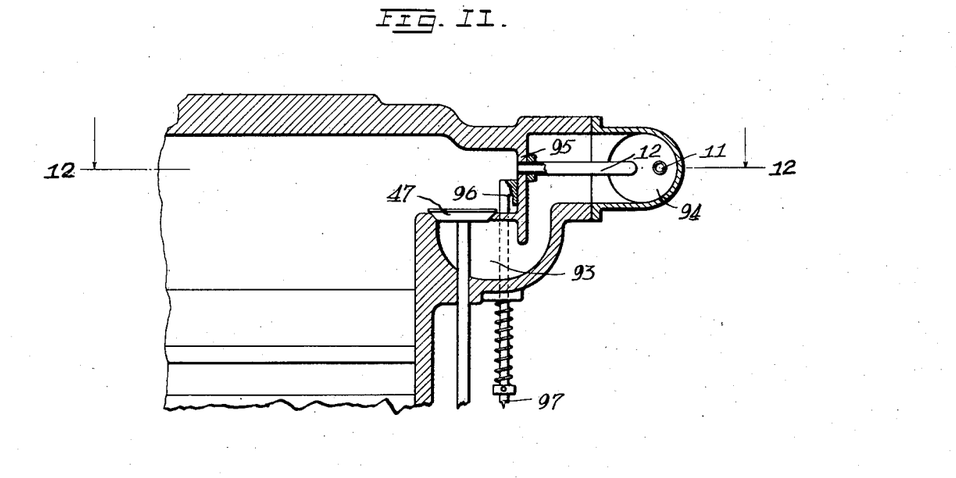
Figure 11 is a fragmentary sectional view similar to Figure 5 but showing a different form of means for leading the vapor into the engine cylinder.
Figure 12:
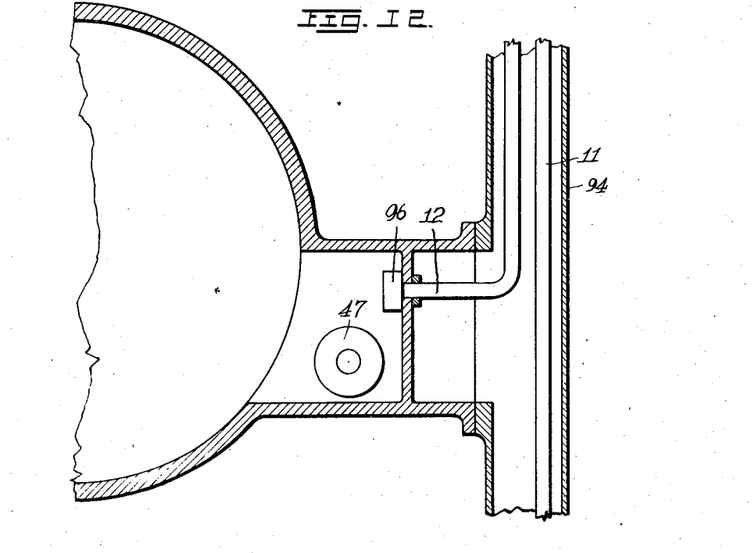
Figure 12 is a fragmentary sectional view through Figure 11 on line 12—12.

Referring to Figures 11 and 12 it will be seen that a different form of construction is presented from that illustrated in Figures 3 to 5, though both forms are utilized for leading the vapor from the vaporizing chamber into the respective cylinders of the engine adjacent the inlet of the air. A particular construction of air inlet 93 has been shown in Figure 11 which receives air from any usual or preferred manifold 94 but it will be evident that any ordinary inlet construction may be used as well as any special construction without departing from the spirit of the invention. However, it is desirable to have the vapor pipe 12 discharge the vapor adjacent the point where the air enters in order that the mixture of the vapor and air may be either interiorly of the cylinder or exteriorly thereof but adjacent thereto and in this way provide a proper explosive mixture without giving the vapor a chance to condense.

As shown in Figures 11 and 12 the pipe 12 extends through the division wall 95 of the engine cylinder and is controlled by a slide valve 96 though some other form of valve might be substituted without departing from the spirit of the invention. This valve is connected with an ordinary rod 97 and it is operated by a cam in a similar manner as shown in Figure 4. The cam is, of course, timed properly to allow the vapor to enter during the suction stroke. Preferably, the parts are timed so that the valve 96 will be open during the first part of the suction stroke while the valve 47 is closed, and the latter to open substantially with the closing of the former.

In this form of the invention the suction or rarefaction produced in the suction chamber is caused by the action of the piston cylinder or in the cylinders causing the fuel to automatically move into the cylinders whenever the respective valves 96 are open.

The pump construction shown in Figures 3 and 4 provides an intermediate mechanism but which secures the same results, namely, the production of rarefaction in the vacuum chamber and the introduction of the vapors secured thereby into the various cylinders at the proper time. It will, of course, be evident that either the construction shown in Figure 1 or that shown in Figures 3 and 4 may be used with either form of suction chamber illustrated in Figure 1 or in Figure 7.

The invention has been described with respect to means for providing a proper explosive mixture for internal combustion engines but it will be evident that the principal involved in the structure shown in Figures 1 and 7 may be utilized for other purposes, as for instance, providing a vapor for steam boilers or for other purposes. Where it is used for steam boilers or other purposes the pump shown in Figure 4 would be desirable or a series of pumps so that the supply of vapors could be continuous and suitable air supplying means could be provided to support the combustion.

What I claim is:—

1. A fuel vaporizing device comprising a closed casing, means for maintaining a level of liquid fuel therein, a jacket surrounding said casing, means for passing heated air through said jacket, means for producing and maintaining rarefaction in said casing in order to cause said fuel to vaporize quickly, and a plurality of means directing said vapor and the air of said jacket in proper proportion to the cylinder of an internal combustion engine.

2. A fuel vaporizing device comprising a closed chamber, means for maintaining a certain level of liquid fuel therein, a plurality of pipes extending into said chamber, each of said pipes having an opening, a valve member movable over said opening so as to close the same, a spring for normally holding said valve member in a partially closed position, means for varying the tension of said spring, means actuated by flow of air past the chamber for opening said valve against the action of said spring to regulate the flow of vapor from said chamber, and means for producing a suction in said pipes whereby vapor will be drawn from said casing, said means causing said vapor to pass to a discharge point.

3. A fuel vaporizing device comprising a closed body, means for maintaining a certain level of liquid fuel in said body, a jacket surrounding said body and spaced therefrom, a plurality of suction pipes extending into said body, a valve for regulating the opening in said suction pipes, an air rush actuated disk connected with said valve and arranged in said jacket, means for directing air into the jacket, means for connecting the jacket with the intake manifold of an engine whereby as the engine is operated the air will be drawn past said disk for moving the same and said valve in proportion to the volume of air passing.

4. A fuel vaporizing device comprising a closed chamber, a jacket surrounding said chamber but spaced therefrom, said jacket having a throat adapted to be connected to the intake manifold of an internal combustion engine whereby when the engine operates there will be a suction produced in said throat, a plurality of pipes having open sections arranged with the open sections in said chamber, means for producing a rarefaction in said pipes whereby they produce a suction in said chamber, a valve for closing the openings in said pipes, means connected with said valve including a disk, said disk being arranged adjacent said throat whereby the valve will be opened in proper proportion to the air volume passing through said throat, a butterfly valve arranged in said throat provided with an enlargement, a spring connected with said disk and a cable connected with said spring and with said enlargement whereby when the butterfly valve is moved to an open position, said spring will be pulled for moving said disk and valve connected therewith so that the valve will be positively opened.

5. A fuel vaporizing system for internal combustion engines comprising a casing or body, means for maintaining a quantity of liquid fuel therein, a vacuum pump for each cylinder of said engine, a pipe extending from each of said pumps to a point interiorly of said body, said pipe being open in the end projecting into said body, an automatically actuated valve for regulating the exposure of said opening, means for supplying air to each cylinder of said engine and means for directing the vapor drawn into said pump so that it will discharge into the air at the instant the air passes into the respective cylinders.

6. A fuel vaporizing system for internal combustion engines comprising a vapor chamber, pumps for exhausting said vapor chamber and drawing vapor therefrom, there being one pump for each cylinder of said engine, an inlet and outlet for said pumps, a reciprocating valve for opening and closing said inlet, means extending from the outlet forming a nozzle and means forming an air passage-way into which said nozzle projects whereby as the air passes through said passage-way to the cylinders of the engine it will become mixed with the vapor forced out of said nozzle.

7. A fuel vaporizing system for internal combustion engines comprising a casing or body, means for maintaining a certain level of liquid fuel therein, a plurality of suction tubes extending into said body, each of said tubes having a vertical slot therein, a valve normally uncovering said slots, a vacuum controlled member connected to said valve for moving said valve partially over said slots, when the pressure interiorly of said body varies, thus uncovering said slots in proportion to the pressure within said body, and a spring for maintaining said valve normally in an open position, means for producing a rarefaction in said pipes and in said body, said means causing vapor from the casing or body arising from said fuel to pass to a discharge point.

8. An oil vaporizing device comprising a casing or body adapted to receive liquid kerosene or other oil fuel, a plurality of pipes extending into said body, means adapted to produce a rarefication in said body whereby the fuel therein being at a pressure lower than atmospheric pressure will vaporize, a gate for regulating the openings to said pipes, an adjustable means for resisting the opening of said gate, a spring connecting said gate, a resilient exhausted diaphragm arranged in said body, a cable connecting said diaphragm with said spring whereby when the said casing or body is exhausted of air the changing pressure in said body will permit said diaphragm to expand and vary the tension on the spring and allow the gate to open more freely for allowing a proportional amount of vapor to escape from said body, and means adapted to be operated by the flow of air to the cylinders of an engine for opening said gate against the action of the resisting means.

9. A carbureting device comprising an air casing, a jet arranged in said casing, means for supplying gasolene to said jet, a bar extending transversely through the passageway leading to said jet, said bar having a reduced section adapted to be positioned in said jet when the jet is operated, an adjustable spring for moving said bar longitudinally a sufficient distance to shift the reduced section to a position midway the passageway leading to the jet whereby fuel is caused to flow, a kerosene vaporizing chamber arranged adjacent said casing, vaporizer means for producing rarefication in said chamber causing the kerosene to more readily vaporize, said means directing the vapor to the cylinder of the engine, and a resilient diaphragm connected rigidly at one end to the walls of said chamber and interiorly thereof while the other end is connected to said bar by means of a flexible cable, said diaphragm expanding in proportion to the rarefication caused in said body and actuating said bar so as to permit gasolene to flow, the gasolene ceasing to flow when the rarefication in the body decreases.

10. A fuel vaporizing system for internal combustion engines comprising a vapor chamber, a pump arranged adjacent each of the cylinders of said engine, means for connecting said pumps to said vapor chamber for drawing the vapor therefrom, means adjacent the pumps for directing vapor from the chamber into the respective cylinders, and means for directing air into the respective cylinders adjacent the inlets of vapor, said pumps, vapor inlets and air inlets being all maintained warm by their position in the respective cylinders.

11. A fuel vaporizing device comprising a closed and substantially air tight chamber, fuel pipes extending into said chamber, means interposed between the cylinders of the engine and said fuel pipes for creating a rarefaction of air in said pipes and said chamber, automatically-actuated sliding means for varying the openings of said pipes in said chamber thereby regulating the flow of fuel from said chamber to the cylinders, and means for supplying fuel to the chamber from the reservoir.

12. A fuel vaporizing device comprising a body presenting a chamber for gasolene fuel and a chamber for kerosene fuel, means for causing a vacuum in said chamber for kerosene fuel, a spring-actuated valve controlling the admittance of the gasolene in the gasolene chamber, a diaphragm responsive to vacuum arranged within the kerosene chamber said diaphragm being connected to the spring-actuated valve for the gasolene chamber to permit a flow of gasolene only when there exists an excessive vacuum in the kerosene chamber, and a valve to control said vacuum also actuated by said diaphragm.

13. A vaporizing device comprising a chamber for vaporizing kerosene fuel and a chamber for vaporizing gasolene fuel, means to create a vacuum within the kerosene fuel chamber, a valve arranged to control the vacuum in said chamber, a diaphragm arranged in said chamber and associated with said valve, and means connected to said diaphragm to control the admittance of gasolene fuel into the chamber for vaporizing the gasoline fuel.

14. A vaporizing device comprising a plurality of fuel vaporizing chambers and vacuum actuated means within one of said chambers to control both the vacuum therein and the fuel to be admitted in the other chamber.

PERCIVAL L. TA'BOIS.